Oct. 28, 1958

J. O. BENSON 2,858,217

CEREAL PRODUCT WITH STRIPED EFFECT
AND METHOD OF MAKING SAME

Filed Feb. 16, 1955

INVENTOR.
JOHN O. BENSON
BY
Stuart R. Peterson
ATTORNEY

United States Patent Office 2,858,217
Patented Oct. 28, 1958

2,858,217

CEREAL PRODUCT WITH STRIPED EFFECT AND METHOD OF MAKING SAME

John O. Benson, Mayer, Minn., assignor to General Mills, Inc., a corporation of Delaware Application February 16, 1955, Serial No. 488,485

8 Claims. (Cl. 99—80)

The present invention relates to a cereal product of the ready-to-eat variety and also pertains to a process of producing such cereal product.

The principal object of the instant invention is to produce a cereal flake having a distinctively attractive appearance and more particularly an aim of the invention is to provide a flake having a plurality of spaced stripes extending substantially from one edge of the flake to the opposite edge thereof. While in most instances it is envisaged that the stripes will be of contrasting color with respect to the remainder of the flake, nonetheless it is within the contemplation of the invention to have these stripes of a different flavor than the rest of the flake. Also, it is within the purview of the invention to have the stripes both of a different color and a different flavor.

Other objects will be in part obvious and in part pointed out more in detail hereinafter.

The invention accordingly consists in the features of the cereal construction and the method by which the cereal is produced, both of which will be exemplified in the construction hereafter set forth and the scope of the application will be indicated in the appended claims.

Figure 1:
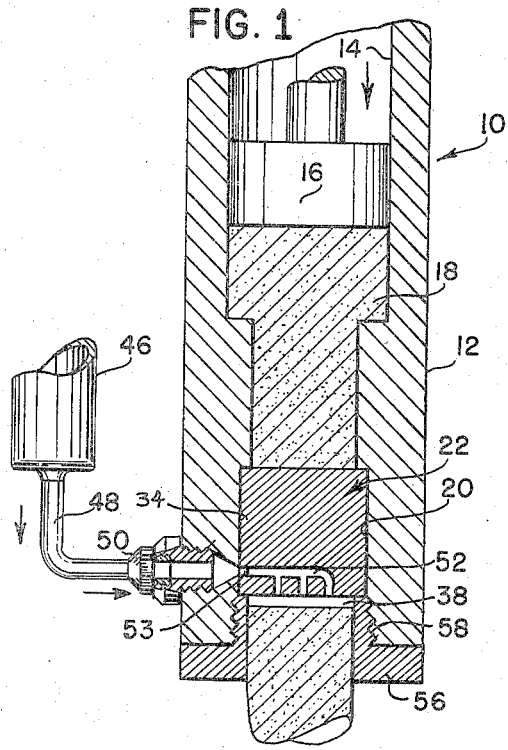
Figure 1 is an elevational view in section showing extrusion apparatus that may be utilized in performing a preferred method of producing my cereal product, the sectional view being taken in the direction of line 1—1 of Figs. 2 and 3.
Figure 3:
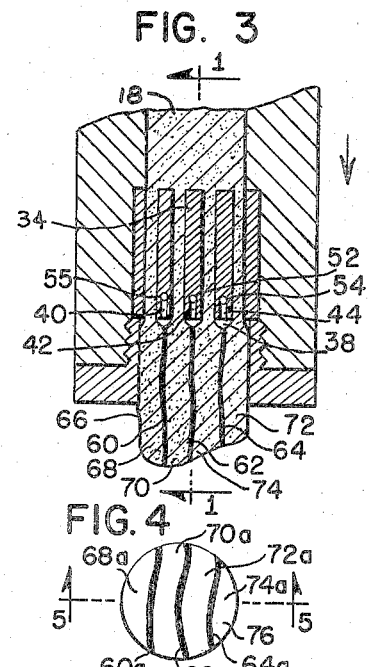
Fig. 3 is a sectional view taken in the direction of line 3—3 of Fig. 2.
Figure 2:
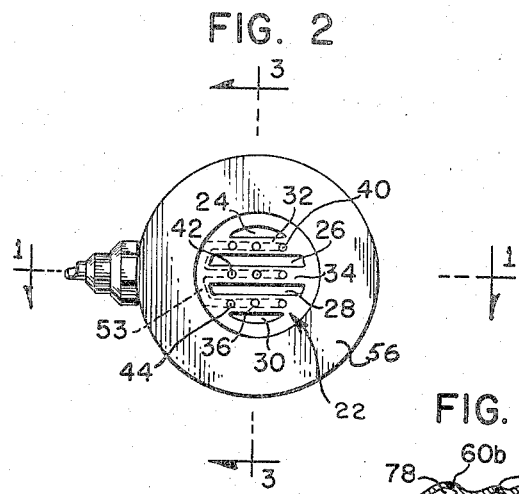
Fig. 2 is a bottom plan view corresponding to Fig. 1.

Referring now in detail to the drawing and more particularly to Figs. 1, 2 and 3 where extrusion apparatus designated generally by the reference numeral 10 has been illustrated as exemplary structure by which the method hereinafter described may be performed, the extrusion apparatus 10 includes a generally cylindrical shell or casing 12 having an upper bore 14 in which is slidably mounted a plunger or piston 16. The plunger or piston 16 is suitably actuated by mechanism not shown, such mechanism being instrumental in urging the piston 16 downwardly against the cooked dough material labelled 18.

The lower end of the cylindrical casing 12 is provided with a bore 20 for the reception of what may generally be termed a divider block 22. As can be discerned from Figs. 2 and 3 the divider block 22 is equipped with a plurality of parallel passages 24, 26, 28 and 30, these passages being formed by intermediate bridging strips or bars designated by the numerals 32, 34, and 36. The function of the bridging strips 32, 34 and 36 is to spread or divide the dough material 18 as it is forced through the passages 24, 26, 28 and 30 by reason of the pressural action developed by the piston 16. By so dividing the dough material a plurality of voids 38 is formed as the dough reforms, which voids may be best seen in Fig. 3 although the most central void appears in the sectional view constituting Fig. 1.

Utilization of the voids 38 is made for the introduction of coloring matter, such as a colored dye liquid, and in furtherance of this specific aim the divider block 22 is also equipped with a number of dye introducing apertures, these apertures being disposed in the bridging strips 32, 34 and 36. As can be observed from an inspection of Fig. 2 the bridging strip 32 has a series of apertures 40, the bridging strip 34 apertures 42, and the strip 36 apertures 44. These apertures or orifices in the illustrative mechanism are supplied gravitationally with liquid dye by reason of a tank or reservoir 46 which has a feeding tube 48 leading into the die apparatus 10, a suitable fitting labelled 50 being shown for the purpose of assuring a fluid tight connection. From Fig. 1 it will be seen that a horizontal passage 52 serves as the communication means with the apertures 42 whereas a partially circumferential groove 53 provides a conduit leading in opposite direction to the apertures 40 and 44. Additional horizontal passages 54 and 55 corresponding to the passage 52 will be provided for connecting the groove 53 with the respective apertures 40 and 44.

For the purpose of retaining the divider block 22 in a fixed operative position a retaining bushing 56 is provided which has integral therewith a threaded tubular boss 58. The boss 58 abuts against the lower circumferential edge of the divider block 22 and in this way the divider block is held in a fixed relation within the bore 20.

As hereinbefore indicated the function of the divider block 22 is to divide or spread the dough material 18 so that the voids 38 are formed and it is into these voids 38 that the dye material from the tank 46 is introduced. Accordingly, attention should now be devoted to Fig. 3 where the stripes bearing the reference numerals 60, 62 and 64 are depicted, these stripes being incorporated into what may be termed a cylinder of dough material labelled 66. What transpires due to the spreading or dividing action of the bridging strips 32, 34 and 36 is that while the dough material is actually separated as it emerges from the lower end of the divider block 22 the bore of the tubular boss 58 is of such dimensions that the divided dough material is reformed and it is this reformed dough material that has been given the numeral 66. Stated somewhat differently, the cylinder 66 comprises a plurality of parallel strips 68, 70, 72 and 74, these strips being distinctly defined by the coloring dye which forms the stripes 60, 62 and 64.

Figure 4:
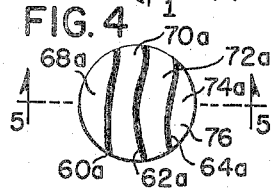
Fig. 4 is a plan view of a single cereal flake or dough wafer before puffing, the figure showing the striped effect which is desired.
Figure 5:
Fig. 5 is the sectional view taken in the direction of line 5—5 of Fig. 4.

After formation of the cylinder 66 the dough material forming this cylinder is dried sufficiently so that the cylinder may be sliced into a series of thin wafers 76, one of which is illustrated in Figs. 4 and 5. From these two figures it will be noted that the stripes 60, 62 and 64 extend from one circumferential edge of the wafer to the other and also extend completely through the thickness of this illustrative wafer. Because the dye material appears as relatively short lengths or increments in Fig. 5, being only portions of the dye stripes shown in Fig. 3, these dye stripes in Figs. 4 and 5 have been differentiated by the addition of the subscript "a." Similarly the strips or sections 68, 70, 72 and 74 have been distinguished from the long strips shown in Fig. 3 by the subscript "a."

Figure 7:
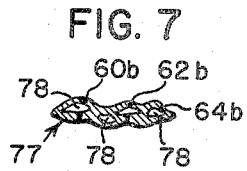
Fig. 7 is a sectional view taken in the direction of line 7—7 of Fig. 6 so as to show the internal structure of one of the puffed cereal flakes.

Upon completion of the slicing operation the wafers 76 are ready for a puffing operation which may suggestively be performed in a radiant puffing oven to produce relatively crisp flakes 77. It will, of course, be appreciated that the stripes $60_a$, $62_a$ and $64_a$ are substantially preserved as far as their identity is concerned even though the wafers 76 are subjected to the radiant puffing action. However, the puffing action is responsible for producing what may be termed a vesicular internal structure and this structure can be seen from an inspection of Fig. 7, Fig. 7 showing a plurality of voids 78 which are formed during the puffing action. Also, it is to be noted from this particular figure that the pictured stripes no longer extend completely through the thickness of the puffed flake, and accordingly these stripes in their modified form have been differentiated by the use of the subscript "b." Of course, it will be recognized that the production of voids 78 follows a random or irregular pattern and, therefore, many portions of the stripes will not be interrupted as depicted in Fig. 7. However, this figure does indicate with considerable particularlity a typical cross section of the flake and its vesicular characteristics.

Before proceeding with a specific example it should be emphasized that while the stripes that have been referred to have been composed of coloring matter, nonetheless such stripes might instead be of a flavoring material so that stripes of contrasting flavor are introduced into the final product. Further it can be appreciated that the stripes may be of both different color from the remainder of the flake and also different flavor, thereby serving in a dual capacity. Thus, it will be recognized that the invention covers marginally modifying the dough material along adjacent sectional edges so that stripes of various colors and/or flavors are produced in the final flake.

At this point it should be stressed that the invention is applicable to a variety of cooked cereal doughs and such doughs embrace derivations from wheat, corn, oats, barley, rye and the like. Further, the doughs may be produced from a single grain or from mixtures thereof and the invention particularly envisages doughs derived from a selected grain together with the addition of a starch for the purpose of improving the puffability of the product. Although these doughs may be cooked in any conventional manner, reference can be had to Collatz Patent 2,162,376, this patent being illustrative of a facile manner in which the cooking of the dough material may be effected. As stated above, although the invention is applicable to cooked doughs in general, it will be described with particular reference to a wheat dough. Also it is to be recognized that adjustments in the dough may be desirable especially in the moisture content thereof and in the relative proportions of the ingredients of the doughs, too. It is felt, however, that these variations can be readily decided upon from a consideration of the following example and from a consideration of the objects to be achieved.

*Example*

A dough was prepared from the following ingredients:

| | |
|---|---|
| Michigan white wheat (ground in a hammer mill equipped with 0.185 inch diameter round hole screen) ___lbs__ | 1.5 |
| Yellow corn cones___lbs__ | 1.25 |
| Cerelose ___gms__ | 125 |
| Salt ___gms__ | 25 |
| Water ___cc__ | 900 |

Small quantity of coloring and flavoring added during extrusion from solution containing:

| | |
|---|---|
| Water ___cc__ | 500 |
| Florasynth Syntharome imitation banana flavor__cc__ | 40 |
| Florasynth chocolate shade F coloring___gm__ | 1 |

The above dough ingredients were cooked in a Baker-Perkins double arm jacketed mixer at approximately atmospheric pressure and at a temperature of 212° F. for approximately 1½ hours with reflux, ½ hour with vent open and ½ hour with top removed. This dough material after cooking had a moisture content of approximately 26% and thus was rendered quite suitable for extrusion through the divider block 22 as illustrated in the drawing.

Figure 6:
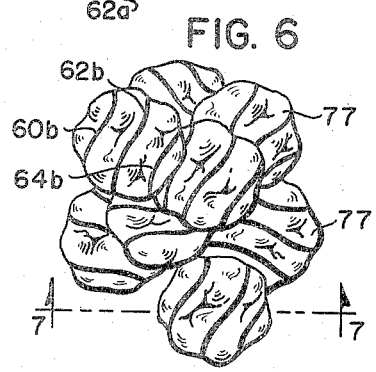
Fig. 6 is a plan view showing a group of cereal flakes after the puffing operation.

Upon emergence from the divider block 22 the aforesaid dough material had suitable plasticity so that it expanded to form a unitary cylinder. However, since there was no kneading action introduced in the production of the dough cylinder 66, it can be appreciated that the stripes 60, 62 and 64 were maintained in a well-defined condition although the expansion due to the plasticity of the dough material desirably caused the stripes to waiver or deviate from a truly straight line throughout the length of the cylinder 66. The cylinder was then dried to approximately 8–10% moisture and then sliced in the form of the wafers 76. The wafers were then puffed at about 8–10% moisture in a radiant puffing oven to yield the flake product depicted in Figs. 6 and 7.

In the above described example the outside diameter of the divider block 22 was approximately ⅞ of an inch and had passages 24, 26, 28 and 30 of approximately ³⁄₃₂ of an inch width. The bridging strips 32, 34 and 36 were approximately ³⁄₃₂ of an inch wide and contained orifices having a diameter of 0.0135 of an inch. The bore of the tubular boss 58 was approximately ⅝ of an inch in diameter with a length of ½ inch. The wafers 76 were cut to approximately 0.040 inch thickness. The foregoing conditions were responsible for producing a dough having the desired characteristics as far as the ease of processing, particularly the extrusion and the desired degree of coalescence deemed advisable as far as forming the unitary cylinder 66. It will be appreciated too that when other doughs are utilized the dimensions given above for the extrusion apparatus may be modified to such an extent as to accommodate these other dough materials. Nonetheless from the specific description presented these variations can be arrived at without difficulty.

Also, it is to be stressed that the exemplified procedure and its associated apparatus are concerned with what may be termed small scale operations. In large scale or mass production situations, provision would be made for the facile introduction of the dough material 18 to the extrusion cylinder 12 by mechanical means, and the dough cylinder 66, as its emerges from the bushing 56, would be subjected immediately to the slicing action of a conventional rotating knife without the employment of a drying step, the moisture content of the dough material itself being appropriately adjusted, where necessary, before extrusion for such an accelerated technique.

Accordingly, it will be recognized that the foregoing description is furnished by way of illustration and not of limitation, and it is, therefore, my intention that the invention be limited only by the appended claims or their equivalents wherein I have endeavored to claim broadly all inherent novelty.

Now, therefore, I claim:

1. A method of preparing cereal flakes comprising the steps of extruding a dough material into strips, adding a striping material between said strips, then causing said strips to be brought together, transversely slicing the dough material so extruded into a plurality of relatively thin wafers, and heating said wafers sufficiently to produce relatively crisp flakes.

2. A method of preparing cereal flakes comprising the steps of extruding a dough material to divide the dough material into a number of strips with space portions therebetween, injecting into said space portions a liquid having a different characteristic from the dough material, coalescing said dough strips together, slicing the coalesced strips transversely into a plurality of relatively thin wafers, and heating said wafers sufficiently to produce relatively crisp flakes.

3. Method according to claim 1 in which the striping material is a flavoring material.

4. Method according to claim 1 in which the striping material is of a contrasting color.

5. A method of preparing cereal flakes comprising the steps of extruding a dough material into strips, adding a striping material between said strips, then causing said strips to be brought together, transversely slicing the dough material so extruded into a plurality of relatively thin wafers, and puffing said wafers sufficiently to produce relatively crisp flakes.

6. A cereal product in the form of a relatively thin flake, said flake comprising short segments of extruded dough strips having between said strips a striping material, said strip segments being situated in a side by side relationship and adhered to each other along their sides to form said flakes, the end faces of said segments lying generally in a plane, the end faces of said segments being puffed outwardly as compared with the areas defining the contact between the segments, the contact between said segments being of said striping material.

7. Product according to claim 6 in which the striping material is a flavoring material.

8. Product according to claim 6 in which the striping material is of a contrasting color.

References Cited in the file of this patent

UNITED STATES PATENTS

| | | |
|---|---|---|
| Re. 19,153 | Battista | May 1, 1934 |
| 1,161,323 | Martin | Nov. 23, 1915 |
| 1,414,022 | Huston | Apr. 25, 1922 |
| 1,463,851 | Smith | Aug. 7, 1923 |
| 1,832,813 | Luke | Nov. 17, 1931 |
| 2,338,588 | Kishlar et al. | Jan. 4, 1944 |
| 2,339,419 | McKay | Jan. 18, 1944 |
| 2,344,901 | Routh | Mar. 21, 1944 |
| 2,428,665 | Harrel et al. | Oct. 7, 1948 |

OTHER REFERENCES

Given: Modern Encyclopedia of Cooking, volume 1, 1949, pp. 701–702.